Oct. 28, 1947.  F. P. HEALY  2,429,685
CHUCK FOR CRANKSHAFT GRINDERS
Filed Aug. 24, 1946   3 Sheets-Sheet 1
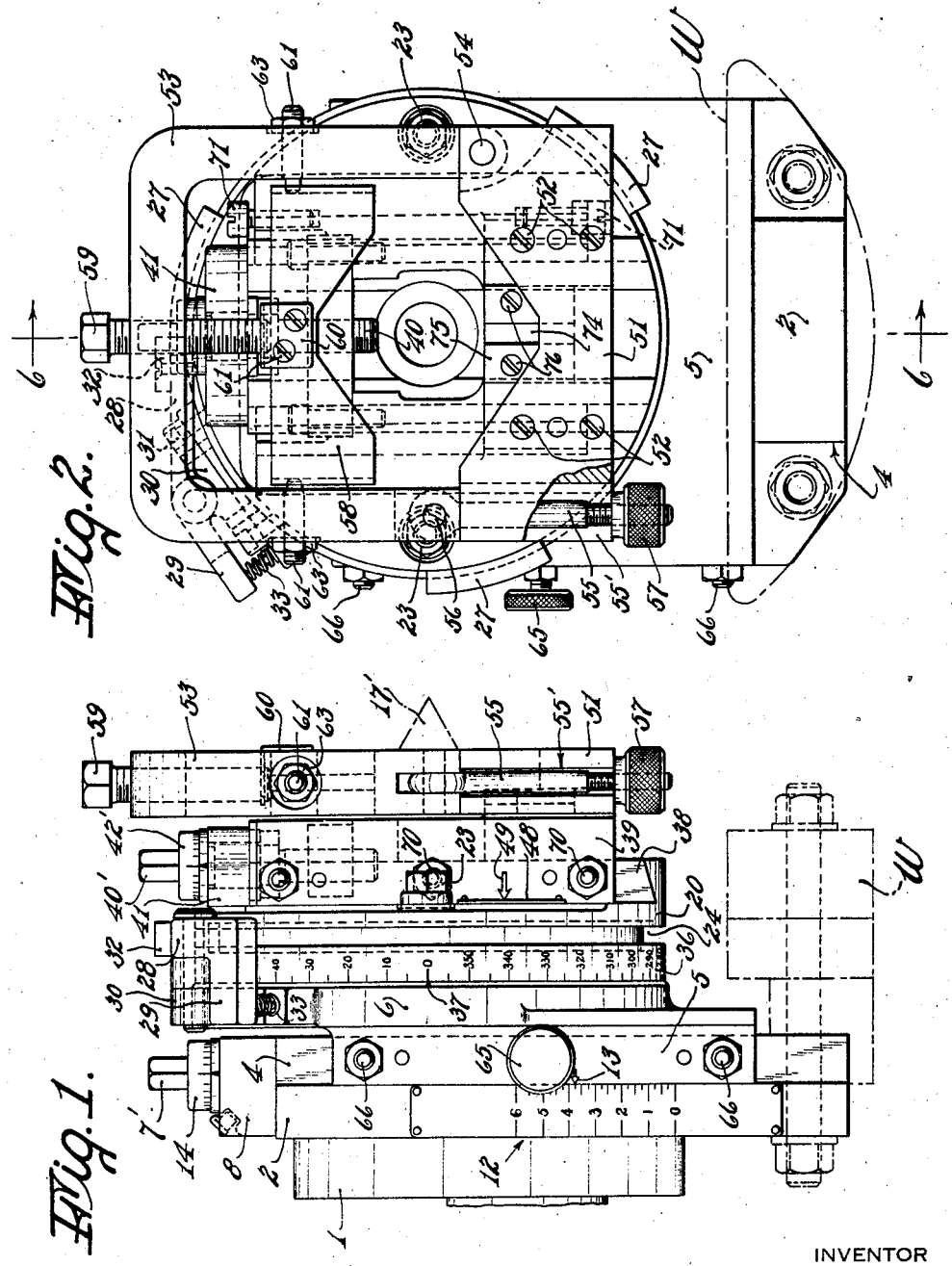
INVENTOR
FRANCIS P. HEALY
BY Chapin & Neal
ATTORNEYS

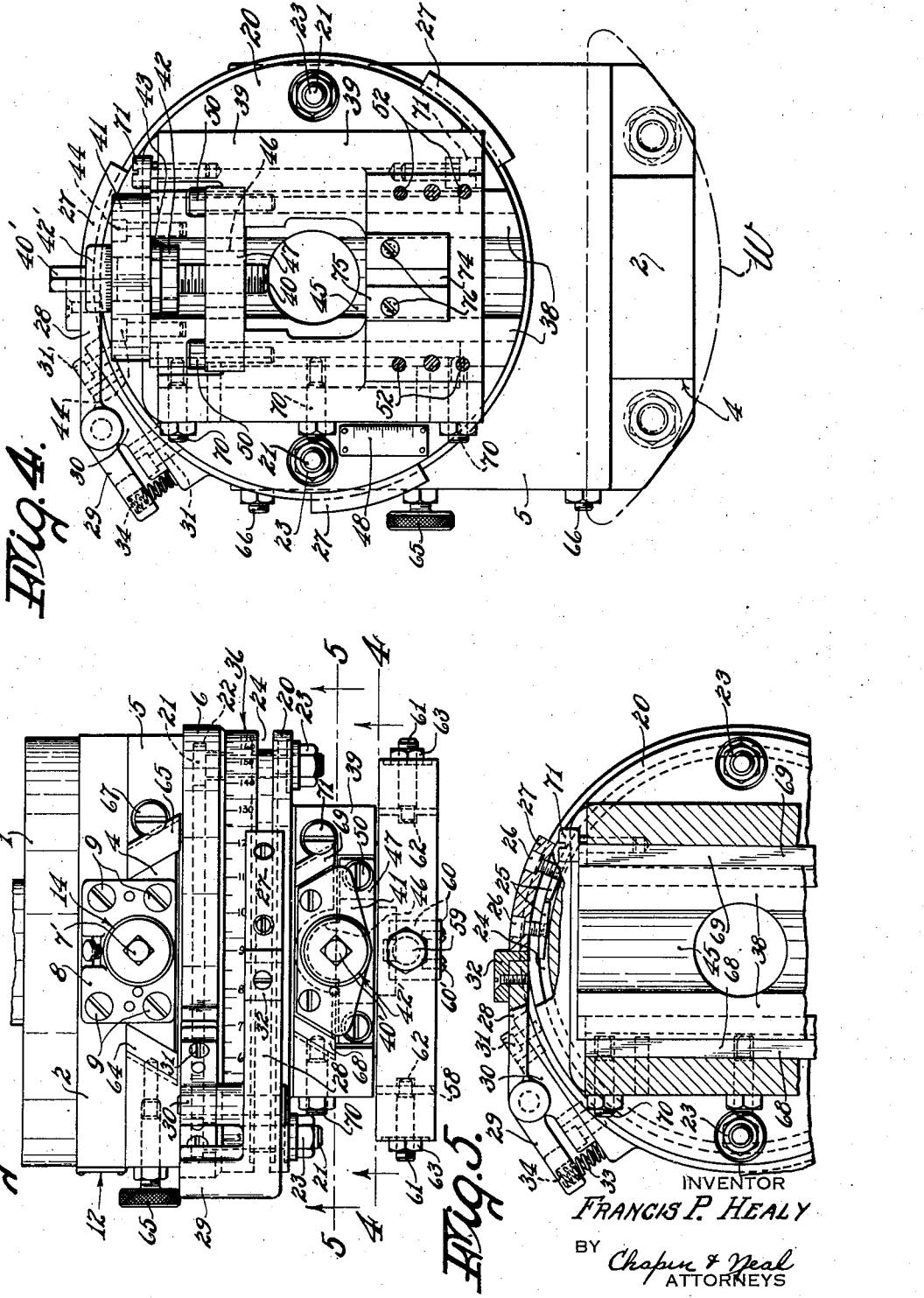

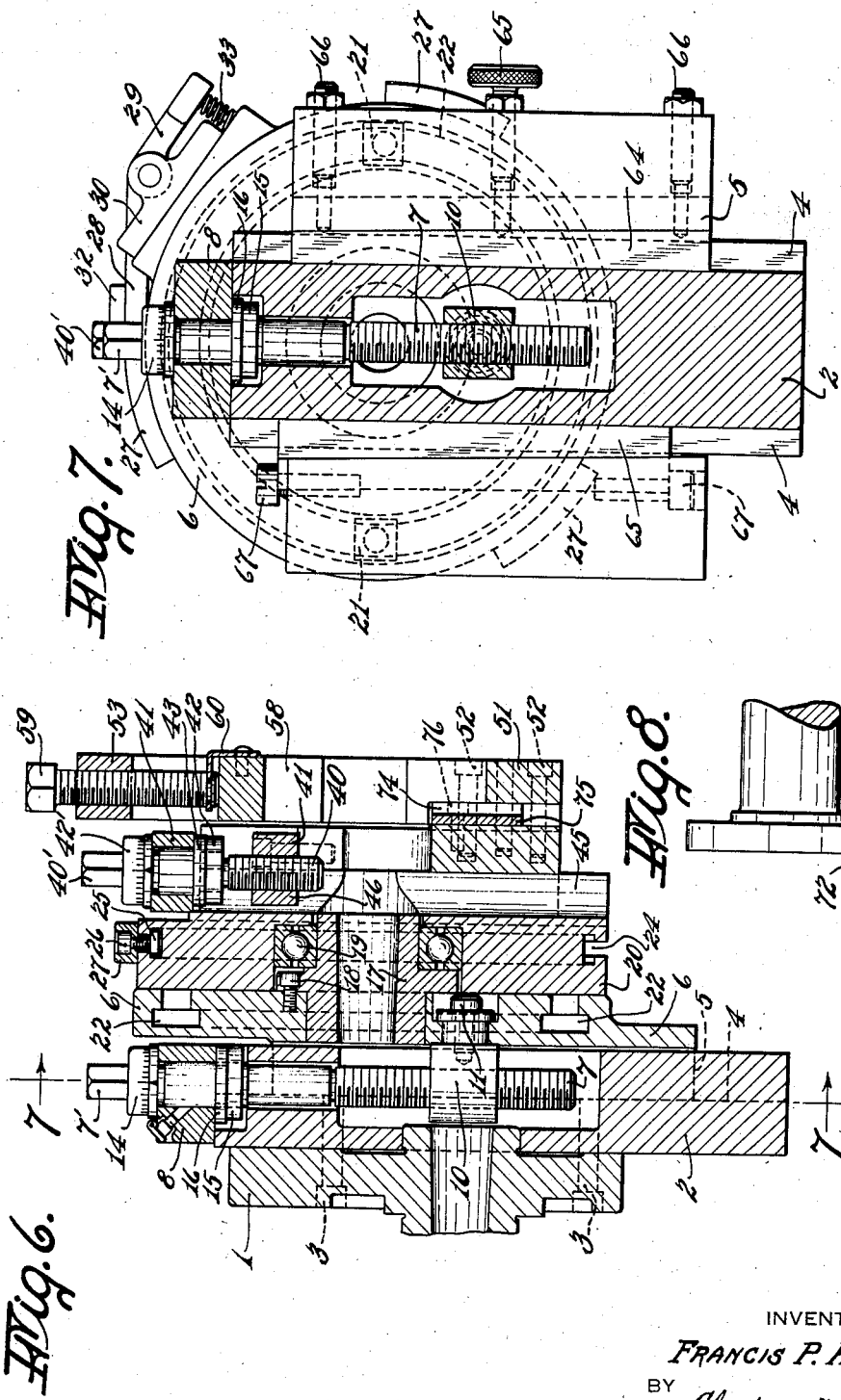

Patented Oct. 28, 1947

2,429,685

UNITED STATES PATENT OFFICE 2,429,685

CHUCK FOR CRANKSHAFT GRINDERS

Francis P. Healy, Springfield, Mass., assignor to Van Norman Company, Springfield, Mass., a corporation of Massachusetts Application August 24, 1946, Serial No. 692,806

4 Claims. (Cl. 51—237)

This invention relates to work holders or work centering chucks for supporting crankshafts during regrinding.

It has been customary in regrinding crankshafts to mount them on lathe centers or, more frequently, to grip the ends of the shafts in chucks, since the centering holes at the ends of the crankshaft are often damaged enough to render them useless as means for accurate positioning during grinding, and to provide means for shifting the centers or chucks laterally so that the pin bearings could be brought into alignment with the axis of rotation of the work head. The difficulties in manipulation and inaccuracies in setting prior devices, using clamping means for holding the crankshafts to the work head have added a twisting effect which imparted to the crankshaft a distortion of sufficient proportions to render accurate alignment of the grinding surfaces with the axis of rotation of the work head extremely difficult, if not impossible.

The disadvantages to which these prior devices have been subject have been avoided in my improved mounting by smoother and more positive means for aligning the crankshaft and crank pin centers with that of the center of rotation of the work head, and by the use of clamping means which leaves the crankshaft free of strain and twisting. In accordance with my invention the head stock is provided with a face plate on which is a transverse slide. A rotatably adjustable head is mounted on this slide and provided with clamping means for holding it in any desired angular adjustment. The axis of rotation of this head is located on the main slide so as to be movable by the latter in a plane including the axis of rotation of the face plate. A second transverse slide, parallel to the first, is mounted on this head and has a V-block attached to it. An inverted U-shaped yoke is hingedly attached to this V-block, and carries a second V-block adjustably mounted to cooperate with the first in receiving a flange or any similar cylindrical surface by which the crankshaft may be attached to the flywheel. An adjusting screw threaded through the U-frame directs pressure to the second V-block along a line connecting the apexes of the two V-blocks thus avoiding a twisting moment which would be created if clamping pressure were applied along a line not in coincidence with that connecting the apexes of the V-blocks. In operation, the crankshaft flange is clamped between the V-blocks, the crankshaft main bearing axis is made concentric with that of the main head by adjusting the fixed V-blocks' support longitudinally on the auxiliary slide, and the main head is positioned on the face plate slide to zero eccentricity for main bearing grinding, or to the desired eccentricity if crank pins are to be ground. Final settings are made with a surface gauge in contact with the surface to be ground. Angular adjustment is made by releasing clamping means on the main head and turning the rotatably mounted plate through any angle desired in accordance with the angularity of the crank pins with respect to the crankshaft or to each other.

The ways on the face plate and on the main head are tapered and cooperate with tapered gibs to provide means for eliminating inaccuracies due to wear or manufacture.

In the drawings:

Fig. 1 is a side elevation of the work centering device;

Fig. 2 is a front view;

Fig. 3 is a top plan view;

Fig. 4 is a view taken on line 4—4 of Fig. 3;

Fig. 5 is a view taken on line 5—5 of Fig. 3;

Fig. 6 is a central sectional view taken on line 6—6 of Fig. 2;

Fig. 7 is a sectional view taken on line 7—7 of Fig. 6; and

Fig. 8 is a detail of a crankshaft flange.

Referring to the drawings, Figs. 1, 3 and 6, to a driving spindle 1 is suitably secured a face plate 2, as by bolts 3 in Fig. 6. The face plate 2 is provided with ways 4 which receive the complementary ways 5 of an offset slide 6. The offset slide 6 is adapted for adjustment on the face plate ways 4 by means of a screw 7 which is held against axial motion in the face plate by a block 8 bolted to the face plate at 9 (Figs. 3 and 4). A nut 10 fixed to the offset slide at 11 carries the offset slide 6 transversely on the face plate slide to position the axis of the chuck concentric with the axis of the spindle 1, or offset an amount equal to half the stroke if crank pins are to be ground (as in the illustration). A scale 12 on the face plate and an arrow 13 on the main head serve to locate the slide in approximate working position. Accurate adjustment is made with the use of an indicator on the bearing surfaces to be worked on after all approximate adjustments have been completed. The screw 7 has a squared end 7' to facilitate turning and a graduated collar 14 to supplement the scale 12. A nut 15 and a collar 16 serve to rigidly attach the screw 7 to the block 8.

A sleeve 17 is fixed to the offset slide as by bolts 18 and carries anti-friction bearings 19 on which a main indexing head 20 is rotatably borne for accurately concentric rotation about the sleeve. The sleeve 17 has an internal tapered bore to receive the tapered end of a supporting center 17' should it be convenient at times to use this type of crankshaft mounting. The main indexing head 20 is normally held from rotating by the clamping bolts 21 which rest in a T-slot 22 machined in the inner face of the offset slide 6 and which are tightened against movement in the T-slot by means of nuts 23 near the outer edge of the front face of main head 20. The nuts 23 are easily reached when angular adjustment of the main head is desired.

The main indexing head 20 has a T-slot 24 cut in its periphery to receive shoes 25 and bolts 26 as clamping means for stops 27. The number of stops required, and their location in the peripheral slot are governed by the characteristics of the crankshaft to be worked. In the drawings the stops are located to accommodate a crankshaft having crank pin eccentricities at 0°, 120° and 240°. The stops 27 cooperate with the finger 28 of an L-shaped member 29 which is pivotally connected to the main indexing head through the member 30 which is bolted to a boss on the main head at 31. The finger 28 may be fitted with a hardened cap 32 to reduce wear. The finger 28 is normally held in locking position by the action of a spring 33 which presses against the underside of the L-shaped member at 34, but may be withdrawn from this position readily by the application of pressure on the abutment 34 of the L-shaped member 29 as with the finger of the operator, in order to rotate the work holder to the next working position. A scale graduated in degrees is marked on the outer surface of the main indexing head at 36 and a cooperating indexing mark is located at 37 on the offset slide 6.

The main indexing head 20 is provided with ways 38 which carry an auxiliary slide 39. The function of the auxiliary slide is to align the crankshaft axis with that of the main head when the crankshaft is supported by the clamping means yet to be described instead of a center. The auxiliary slide 39 is adjusted by means of a screw 40 held against longitudinal movement in a block 41 by means of a nut 42 and a collar 43. The block 41 is fixed to the ways 38 of the main indexing head by means of bolts 44. The ways 38 have a centrally located transverse recess 45 to permit free passage of a semicircular abutment 46 of a slide carrying bar 47 which is threaded to receive the adjusting screw 40. The screw 40 has a squared end 40' to facilitate turning, and a graduated collar 42' to supplement the accuracy of a scale 48, located on the front face of the main head. An indexing arrow 49 scribed on the auxiliary head cooperates with the scale 48 to permit approximate presetting of the auxiliary slide with respect to the main head. The bar 47 is fixed to the auxiliary slide 39 by bolts 50.

In Figs. 1, 2, 3 and 6 a V-block 51 is fixed to the auxiliary slide 39 by bolts 52. An inverted U-shaped yoke 53 is hinged to the V-block 51 at 54 and clamped to it when desired by a swinging clamping bolt 55 pivoted at 56 to the yoke 53 and adapted to fit in slot 55' cut in the V-block 51. A nut 57 serves to complete the yoke clamping mechanism. A second V-block 58 adjustably held in cooperating relationship with the first in the yoke 53 is adapted to complete the arrangement by which a flange on the crankshaft may be held and centered. Adjusting bolt 59 is threaded through the yoke 53 and bears against the top of the V-block 58 forcing it toward V-block 51 when the bolt 59 is turned in one direction, and carrying it away from V-block 51 when the bolt is turned in a reverse direction. An angle plate 60 fixed to the V-block at 60' loosely holds the bolt 59 to the V-block and enables the V-block to be carried with the bolt when the bolt is withdrawn. Guiding bolts 61 threaded through the yoke rest in grooves 62 cut in the sides of V-block 58 and serve to guide the V-block. Lock nuts 63 hold the bolts 61 in position.

It is obvious that the accuracy of the settings made to both the offset slide and the auxiliary slide depends to a great extent on the fit between the ways on the face plate and the main head and their cooperating slides. Common methods for taking up looseness due to wear would result in a lateral displacement of the one axis with respect to the other resulting in an added eccentricity unwanted and entirely separate from that imparted by the proper manipulation of the standard adjustments provided. To eliminate this the inner sliding surfaces of the ways 5 on the offset slide 6 have been tapered as indicated in Figs. 3 and 7. These tapered surfaces cooperate with the tapered surfaces of shims 64 and 65 whose inner faces are in sliding contact with the ways 4 of the face plate. Shim 64 may be urged toward the ways 4 by the knurled handknob 65 and the bolts 66, while shim 65 may be adjusted longitudinally along the ways 4 by bolts 67 giving a transverse adjustment of one axis with respect to the other. A similar arrangement is used for adjustment of the auxiliary sliding head on ways 38 of the main indexing head. Tapered shims 68 and 69 are inserted between the ways 38 and sliding head 39. Shim 68 is located by means of bolts 70, while shim 69 may be given a longitudinal adjustment along the ways when so urged by bolts 71.

Generally the flywheel flange of a crankshaft has a projecting dowel to insure correct angular relationship to the flywheel. In such cases, as in Fig. 8, the dowel 72 of the flange 73 fits into a slot 74 of a block 75 which is fixed to the slide 39 by bolts 76. This registers the crankshaft in definite relationship to the work holder and prevents any possibility of slipping.

In order to prevent excessive and injurious vibration due to unbalanced weight, counterweights W may be added to the face plate 2 as indicated in Figs. 1, 2 and 4.

What I claim is:

1. In a chuck for holding crankshafts during grinding, a face plate rotatable around an axis, a main slide adjustable for radial movement on the face plate, a head rotatably mounted on the main slide around an axis parallel to, and movable by the slide in a plane including, the axis of the face plate, an auxiliary slide mounted on the head for radial movement, a V-block fixed to the auxiliary slide, a second V-block adjustably spaced from the first, and means for moving the second V-block toward the first by pressure directed solely along the plane joining the apexes of the V-blocks.

2. In a chuck for holding crankshafts during grinding, a face plate rotatable around an axis, a main slide adjustable for radial movement on the face plate, a head rotatably mounted on the main slide around an axis parallel to and movable by the slide in a plane including, the axis of the face plate, an auxiliary slide mounted on the head for radial movement, a V-block fixed to the auxiliary slide, a U-frame hinged to the fixed V-block at one side, means for clamping the unhinged side of the U-frame to the fixed V-block, a second V-block adjustably mounted in the U-frame in cooperating relationship with the first V-block, and means for moving the second V-block toward the first by pressure directed solely along the plane joining the apexes of the V-blocks.

3. In a chuck for holding crankshafts during grinding, a face plate rotatable around an axis, a main slide adjustable for radial movement on the face plate, a head rotatably mounted on the main slide around an axis parallel to, and movable by the slide in a plane including the axis of the face plate, an auxiliary slide mounted on the head for radial movement, a V-block fixed to the auxiliary slide, a U-frame hinged to the fixed V-block at one side, means for clamping the unhinged side of the U-frame to the fixed V-block, a second V-block adjustably mounted in the U-frame in cooperating relationship with the first V-block, and an adjusting screw threaded through the U-frame loosely held to the adjustable V-block, the pressure applied by the adjusting screw being directed solely along the plane joining the apexes of the V-blocks.

4. In a chuck for holding crankshafts during grinding, a face plate rotatable around an axis, a main slide adjustable for radial movement on the face plate, a head rotatably mounted on the main slide around an axis parallel to, and movable by the slide in a plane including the axis of the face plate, an auxiliary slide mounted on the head for radial movement, a V-block fixed to the auxiliary slide, a U-frame hinged to the fixed V-block at one side, means for clamping the unhinged side of the U-frame to the fixed block, a second V-block adjustably mounted in the U-frame in cooperating relationship with the first V-block, one of said V-blocks having means thereon for engaging a dowel on the flywheel flange of a crankshaft to register the crankshaft in definite angular relationship to the work holder, and an adjusting screw threaded through the U-frame and loosely held to the adjustable V-block, the pressure applied by the adjusting screw being directed solely along the plane joining the apexes of the V-blocks.

FRANCIS P. HEALY.